United States Patent [19]

Nassar

[11] Patent Number: 4,670,875

[45] Date of Patent: Jun. 2, 1987

[54] MULTIPLEXED DUAL TONE MULTI-FREQUENCY ENCODING/DECODING SYSTEM FOR REMOTE CONTROL APPLICATIONS

[76] Inventor: Dale Nassar, P.O. Box 33, Greenburg, La. 70441

[21] Appl. No.: 764,109

[22] Filed: Aug. 9, 1985

[51] Int. Cl.$^4$ ............................................... H04J 3/12
[52] U.S. Cl. ................................ 370/110.2; 370/110.3
[58] Field of Search ............................ 370/110.2, 110.3; 340/825.71–825.76, 825.83; 179/2 DP, 84 SS, 84 VF

[56] References Cited

U.S. PATENT DOCUMENTS

| | | | |
|---|---|---|---|
| 3,766,523 | 10/1973 | Brocker et al. | 340/825.75 |
| 4,004,276 | 1/1977 | Robinson et al. | 340/825.75 |
| 4,064,487 | 12/1977 | Russell et al. | 340/825.75 |
| 4,307,266 | 12/1981 | Messina | 179/84 VF |
| 4,406,926 | 9/1983 | Duncan | 179/84 VF |
| 4,453,042 | 6/1984 | Wolf et al. | 179/84 VF |
| 4,479,229 | 10/1984 | Wolters | 340/825.74 |

Primary Examiner—Douglas W. Olms
Assistant Examiner—Wellington Chin
Attorney, Agent, or Firm—Robert C. Tucker; William David Kiesel

[57] ABSTRACT

A multiplexed dual tone multi-frequency (DTMF) encoding/decoding system for remote control applications is provided whereby simultaneous combinations of activated switches may control a device at a remote location via a conventional DTMF encoder/decoder system. The system utilizes a unique multiplex type DTMF signaling technique to increase the previously possible number of coded signals generated and correspondingly decoded. Each desired combination of activated switches results in the activation, by a first read only memory and an oscillator-divider, of a pair of data lines which in turn activate a DTMF tone encoder, resulting in the generation of a pair of dual tones in alternating sequence which are transmitted over a single channel communications link to a DTMF decoder. The decoder converts each dual tone signal to a code, activating a desired pair of data lines. A pulse stretcher then holds the activated state corresponding to one of pair of activated data lines while a second dual tone signal is received and converted to a code, activating an additional desired pair of data lines. A third read only memory receives the four signals corresponding to the pair of encoded dual tone signals and activates a desired combination of relays or other control devices. A filter/momentary hold array may be added between the third read only memory and the control device to eliminate extraneous signals and to provide a smooth transistion between changes in combinations of activated switches.

15 Claims, 9 Drawing Figures

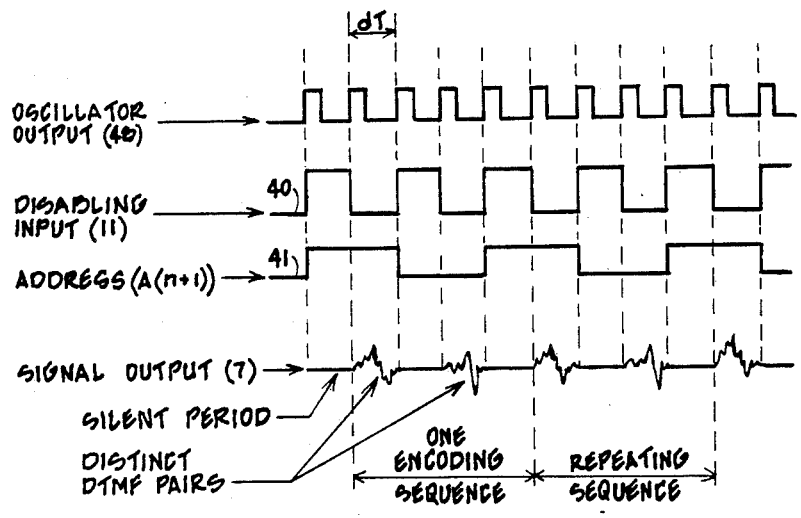
FIGURE 2
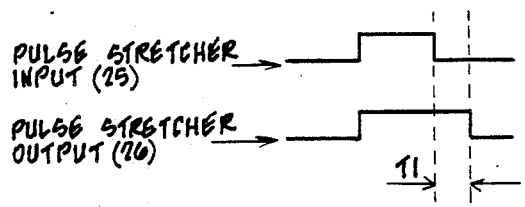
FIGURE 4A
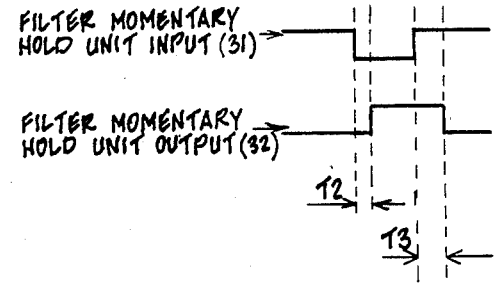
FIGURE 4B
| DTMF TONES | H1 (EC1) | H2 (EC2) | H3 (EC3) | H4 (EC4) |
|---|---|---|---|---|
| L1 (ER1) | L1, H1 | L1, H2 | L1, H3 | L1, H4 |
| L2 (ER2) | L2, H1 | L2, H2 | L2, H3 | L2, H4 |
| L3 (ER3) | L3, H1 | L3, H2 | L3, H3 | L3, H4 |
| L4 (ER4) | L4, H1 | L4, H2 | L4, H3 | L4, H4 |
FIGURE 8

MULTIPLEXED DUAL TONE MULTI-FREQUENCY ENCODING/DECODING SYSTEM FOR REMOTE CONTROL APPLICATIONS

BACKGROUND OF INVENTION

1. Field of the Invention

This invention relates generally to remote control devices and, more particularly, to devices utilizing dual tone multi-frequency (DTMF) systems for remotely activating control devices via a single channel communications link.

2. Prior Art

There are many industrial applications for remote control systems. Many such systems require a high degree of reliability. A stray signal in such a system could cause erratic behavior with dangerously heavy equipment. In systems where a high degree of reliability is essential, remote control has been provided by an array of momentary action switches, each of which is connected to a corresponding control relay by an individual wire, commonly referred to as a multi-channel (or multi-wire) link. An example of such a control system can be found in multifunction transferring devices (e.g. overhead cranes, hydraulic lifts, etc.). In such devices, individual relays are provided for activating each function possible (e.g. "off", "on", "up", "down", "left", "right", "forward", or "reverse"). A multi-wire connection would normally allow any valid combination of control functions, e.g. "up-right-forward", to be activated simultaneously. Also, a multi-wire connection allows for a smooth transition between combinations of control functions, e.g. from "up-right" to "up-right-forward", eliminating discontinuous action when switching between such overlapping control functions. Thus, an operator could alternately switch between commands with no break in the common (in the above case, the "upright") action of the controlled device. An inherent problem of multi-wire connections is the lack of mobility of the operator. Frequently, due to the physical limitations of multi-wire controllers, operators are required to position themselves dangerously near, or even under, the load being handled. However, multi-wire devices have been preferred due to the direct connection between the remote control and the control device, thereby reducing the likelihood of a stray signal or other outside interference influencing the control device.

The inherent noise immunity and reliability of DTMF encoding/decoding systems make them especially acceptable for applications in controlling multi-function systems over a single channel communications link, especially where interference-free operation is essential. As opposed to a multi-wire link, a single channel link is not dependent upon the DTMF encoding/decoding units and may thus be chosen to fit the user's needs. The simple single channel link may be a single wire pair or any elementary single channel radio, optical, or sonic device. Also, the recent advent of specialized DTMF encoding and decoding integrated circuits allows DTMF based remote control systems to be low in cost as well as simple, efficient, small in size and lightweight. However, conventional DTMF encoding/decoding techniques allow only a single encoding switch (of which 16 are possible in a standard system) to be activated at any one time, producing and ultimately receiving a dual tone representing a position (row and column) in a four-row, four-column matrix. Therefore, the simultaneous multi-function control capability of a multi-wire link has not been heretofore simulated by conventional DTMF encoding/decoding techniques.

SUMMARY OF THE INVENTION

Therefore, it is an object of this invention to provide an enhanced DTMF encoding system which will allow a plurality of signal activating switches to be activated simultaneously and to provide a corresponding DTMF decoding system to decode the encoded signals.

It is another object of this invention to provide such an encoding/decoding system whereby each switching combination that represents a control function generates a distinct code, and all possible codes have a common format.

It is yet another object of this invention to provide such an encoding/decoding system having a means of increasing the number of previously possible coded signals generated and correspondingly decoded, without altering the structure of standard DTMF waveforms.

It is a further object of this invention to provide such a system having a means of eliminating discontinuous action when switching between overlapping control functions.

It is still a further object of this invention to provide such a system wherein programmability is supplied to the encoder and/or decoder circuitry, allowing the user to specify any desired output (decoded) switch activation status corresponding to any input (encoded) status.

It is an additional object of this invention to provide such a system wherein programming is to be accomplished without rewiring of the system.

It is still an additional object of this invention to provide a system accomplishing all of the above objectives while preserving all of the advantages of conventional DTMF based remote control systems.

Accordingly, a multiplexed dual tone multifrequency (DTMF) encoding/decoding system for remote control applications is provided whereby simultaneous combinations of activated switches may control a device at a remote location via a conventional DTMF encoder/decoder system. The system utilizes a unique multiplex type DTMF signaling technique to increase the previously possible number of coded signals generated and correspondingly decoded. Each desired combination of activated switches results in the activation, by a first read only memory and an oscillator-divider, of a pair of data lines which in turn activate a DTMF tone encoder, resulting in the generation of a pair of dual tones in alternating sequence which are transmitted over a single channel communications link to a DTMF decoder. The decoder converts each dual tone signal to a code, activating a desired pair of data lines. A pulse stretcher then holds the activated state corresponding to one pair of activated data lines while a second dual tone signal is received and converted to a code, activating an additional desired pair of data lines. A third read only memory receives the four signals corresponding to the pair of encoded dual tone signals and activates a desired combinaiton of relays or other control devices. A filter/momentary hold array may be added between the third read only memory and the control device to eliminate extraneous signals and to provide a smooth transition between changes in combinations of activated switches.

BRIEF DESCRIPTION OF THE DRAWINGS

FIG. 2 illustrates the relationship of a signal waveforms at various nodes of the FIG. 1 diagram.

FIGS. 4A and 4B illustrate the relationship among the input/output signal waveforms of the pulse stretchers and filter/momentary hold units respectively by the embodiment shown in FIG. 3.

FIG. 8 depicts a matrix illustrating the possible pairs of tones generated by a standard eight tone DTMF encoder.

DETAILED DESCRIPTION OF THE INVENTION

Figure 1:
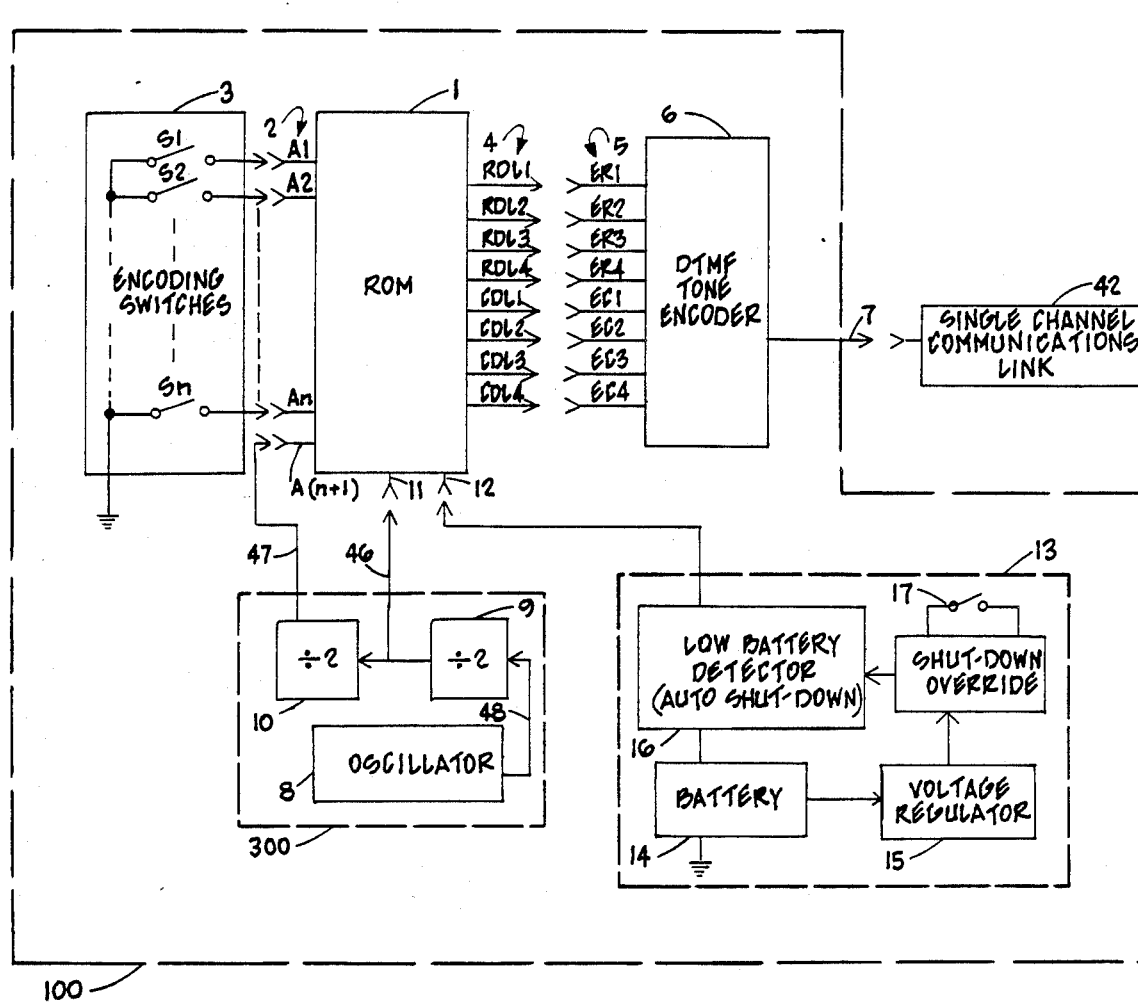
FIG. 1 is a block diagram of a preferred embodiment of the DTMF encoder of this invention.

The encoder unit 100 shown in FIG. 1 is interconnected with a plurality of "n" encoding switches S1-Sn that may be activated in any desired combination (of $2^n$ possible combinations) to command specific load(s) to correspondingly be energized at the decoder unit 200, resulting in the actuation of a control device 36. The encoding switches S1-Sn represent any desired array of control/encoding switches 3, such as those in multi-function transfer devices (e.g. "up", "down", "forward", "reverse", "left", and "right" switches). System power is provided by convenient means, such as system power unit 13.

Each of the encoding switches S1-Sn is connected to one address line A1-An of the address input 2 of a first (encoder) read only memory (ROM) 1, having at least "n+1" such address lines (the significance of address line A(n+1) will be explained subsequently), such that when any encoding switch S1-Sn is activated, the corresponding address line A1-An is activated. The first ROM 1 is programmed to provide a specific data output 4 for any possible combination of activated address lines A1-A(n+1). For the purposes herein, the term "ROM", while intended to primarily encompass an integrated circuit, also is intended to encompass any combination of electrical components which will achieve the same result. It is preferred that the data output 4 comprise four row data lines RDL1-RDL4 and four column data lines CDL1-CDL4, such that, for any valid combination of activated address lines A1-A(n+1), one row data line RDL1-RDL4 and one column data line CDL1-CDL4 will be activated. Invalid switch combinations, such as a "forward"-"reverse" combination, will be programmed to provide no data output 4 from the first ROM 1. Otherwise for a valid combination, such as "forward"-"left"-"down", first ROM 1 will be programmed to activate a desired combination of data lines as will be described in detail subsequently. Each of the row data lines RDL1-RDL4 is connected to one of the row inputs ER1-ER4 on the encoder input bus 5 of a DTMF tone encoder 6. Correspondingly, each of the column data lines CDL1-CDL4 is connected to one of the column inputs EC1-EC4 on the encoder input bus 5. The logic state (high or low) of these eight inputs 5, taken in a two-of-eight (one row input ER1-ER4 and one column input EC1-EC4) format, determines which DTMF tone signal (of sixteen possible in a standard unit) is to be generated at tone output 7. Each DTMF tone signal comprises a pair of tones of different frequencies, identifying a particular row-column combination. Tone output 7 is connected via any convenient single channel communications link 42 to the signal input 18 of a DTMF receiver 19.

An oscillator-divider 300 provides a means to increase the number of possible signals to be transmitted by the DTMF encoder 6. A continuously running oscillator 8 supplies clock pulses through oscillator output 48 to two cascaded "divide-by-two" counters 9 and 10 whose outputs are square waves. The output 46 of first counter 9 drives a disabling input 11 of first ROM 1. Whenever disabling input 11 is at a logic high, data output 4 of first ROM 1 is in a high-impedance (Hi-Z) state, which results in no signal generated at tone output 7 of tone encoder 6. The output 47 of second counter 10, which is driven by the first counter 9, drives an additional address line A(n+1) of first ROM 1. First ROM 1 could also be provided with another address line A(n+2) (not shown) which could be programmed to perform the function of disabling input 11. The term "disabling input" should therefore include any input which would serve the function of causing tone output 7 to remain silent.

FIG. 2 depicts the relationship of the waveforms of oscillator output 48, disabling input 11, address A(n+1), and the tone output 7. For any combination of activated encoding switches S1-Sn, the continuously oscillating additional address line A(n+1) alternately addresses two distinct locations of first ROM 1 in repeated sequence. As previously explained, first ROM 1 is programmed to activate one row data line RDL1-RDL4 and one column data line CDL1-CDL4 for each valid combination of activated address lines A1-A(n+1). Thus, by properly programming first ROM 1, a valid signal generated by the encoder unit 100 comprises two distinct DTMF signals, consisting of two distinct pairs of tones, separated by a period of silence, occuring in repeated (multiplexed) sequence for as long as the combination of encoding switches S1-Sn remains activated.

In standard DTMF tone encoder/decoder system, each DTMF signal preferably has a duration of 20-50 ms, which is ample time to be processed by a DTMF receiver 19. The signal duration is represented by "dT" in FIG. 2. Each signal is preceded and followed by a period of silence approximately equal to dT. The length of dT is determined by the frequency of oscillation of oscillator 8. The oscillator-divider 300 generates a first (preferably 50% duty cycle) pulse train 40 through disabling input 11 having a period of dT, and a second (preferably 50% duty cycle) pulse train 41 through additional address line A(n+1) having a period of 2(dT) As shown in FIG. 2, every other time the first pulse train 40 achieves a change of state (low to high or high to low), the second pulse train 41 changes state. First pulse train 40 and second pulse train 41 may be generated by means of other than those previously described, so long as this relationship between the pulse trains 40, 41 remains constant. By decreasing dT, the time delay between the actuation of encoding switches S1-Sn and the actuation of the control device 36 is correspondingly decreased.

To define the composition of a valid signal according to the embodiment shown in the Figures, consider the eight tones generated by a standard DTMF tone encoder 6, which are divided into two groups of four:

(a) a low tone group L1-L4, corresponding to, for example, encoder row inputs ER1-ER4; and (b) a high tone group H1-H4, corresponding to encoder column inputs EC1-EC4. FIG. 8 shows the sixteen possible pairs of dual tones for this example. A valid signal may consist of, for example, the tone pair sequence L1,H2-L2,H3 which is preferably made up of four distinct tones (L1, L2, H2 and H3), with each tone pair comprising a DTMF signal. It should be noted that two distinct DTMF pairs do not always constitute a usable signal. For example, if the sequence L1,H2-L2,H3 is programmed in first ROM 1 as a control signal, then the sequence L1,H3-L2,H2 becomes invalid because it contains the same four tones (distinct valid signals preferably cannot consist of the same four tones). Also, a sequence such as L1,H2-L1,H4 is not a valid signal due to the common tone L1 (this sequence consists of only three distinct tones). The requirement of four distinct tones even further enhances the reliability of the DTMF system, further reducing the chance of a stray signal being received by the decoder unit 200. With the four distinct tone requirement, the encoder unit 100 can produce thirty-six control signals from the eight elementary tones as opposed to sixteen in a standard DTMF system. Of course, if additional combinations of control signals are preferred, the first ROM 1 may be programmed to generate dual tone combinations of only three distinct tones.

In order to enhance the versatility of the encoder unit 100, first ROM 1 may take the form of a programmable read only memory (PROM) an eraseable programmable read only memory (EPROM), or an electrically erasable read only memory (EEPROM). By utilizing an EPROM or EEPROM, the desired combinations of valid switch commands may be changed to fit varying remote control functions. Also, as described above, the number of required distinct tones may be varied. It will be readily understood that EPROM's may be substituted for ROM's in the decoder unit 200 for further versatility. Also, the embodiments described herein are chiefly those utilizing a standard DTMF encoding/decoding system having eight possible tones. By increasing or decreasing the number of possible tones, other parameters of the system will be correspondingly vary. It is preferred, however, that standard DTMF systems be utilized due to availability and economy.

The system power unit 13 may be energized by a battery 14 from which a constant voltage source +V is obtained by a voltage regulator 15 to power the logic circuitry. Because much of the decoding circuitry may exhibit erratic behavior at excessively low supply voltage, a low voltage detector 16, which acts as a safety device, continuously monitors the battery voltage during operation of the encoder unit 100 and shuts down the system by disabling first ROM 1 via additional disabling input 12. This action discontinues all signal generation whenever the battery voltage falls near a critical level for the input of voltage regulator 15. The system shut down correspondingly stops any action triggered by the encoding signals. A shut down override switch 17, when activated, will override the shut down action and again enable the encoding circuitry. The override function is intended for use only when a shut down occurs at an inconvenient time. Because the automatic shut down should usually be set to occur before a critical low voltage level is reached, the override can be safely used, but only for a short period of time. The battery 14 should be recharged after a shut down occurs. Of course, a spare battery 14 may be provided in order to assure continuous operation during critical periods.

Figure 5:
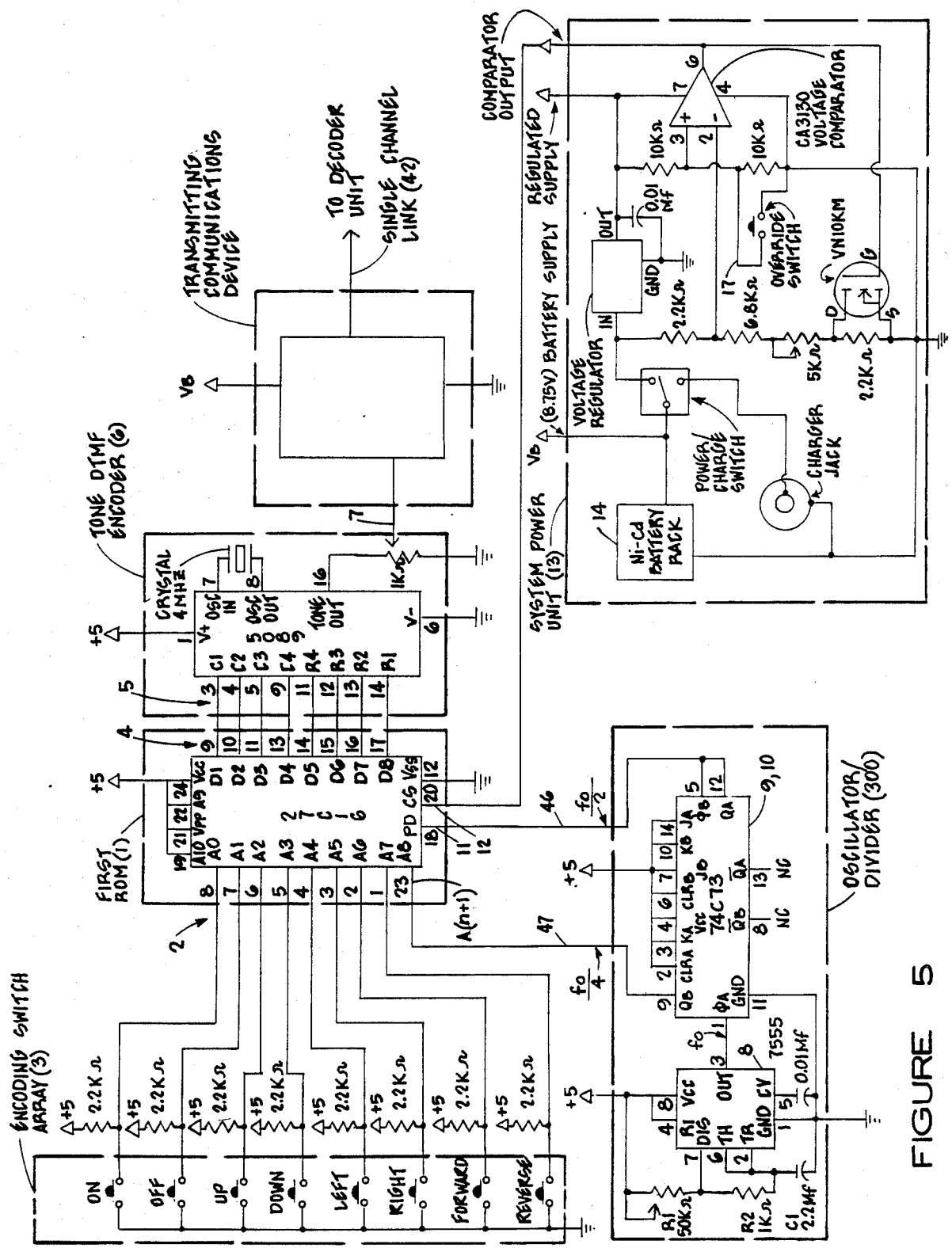
FIG. 5 is a wiring diagram illustrating one construction of the preferred embodiment shown in FIG. 1.

A preferred embodiment of a wiring diagram for the encoder unit 100 is shown in FIG. 5. Examples of the various components of the encoder unit 100 are shown by standard electrical designations and typical values are indicated. ROM 1 is shown as a No. 27C 16 EPROM as manufactured by National Semiconductor under No. NMC27C16. First and second counters 9 and 10 are both contained in a No. MM74C73 dual J-K flip-flop as manufactured by National Semiconductor. Oscillator 8 is shown as a CMOS timer No. 7555. The voltage regulator 15 is shown as 5V No. 7805 regulator. A No. CA3130 BiMOS operational amplifier and a No. VN10KM power FET are also employed in the system power unit 13 circuitry. The DTMF tone encoder 6 is shown as a No. TCM5089 tone encoder. A Mostek No. MK5085/6 or MK5087 encoder could also be similarly employed.

Figure 3:
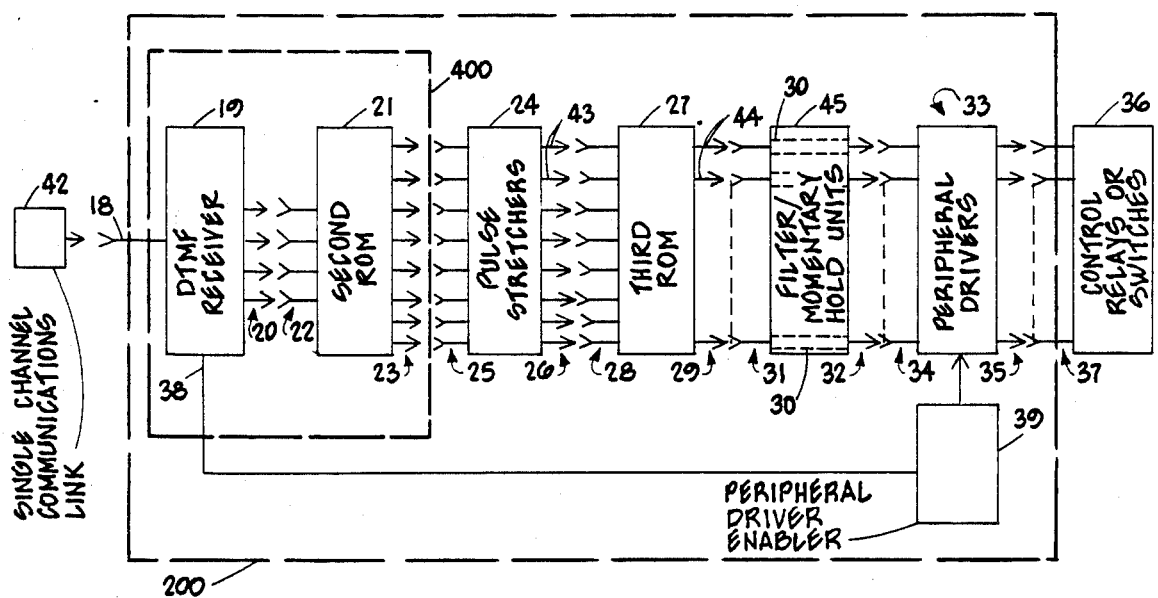
FIG. 3 is a block diagram of a preferred embodiment of the DTMF decoder of this invention.

The decoder unit 200 is illustrated in FIG. 3. Single channel communications link 42 is connected to signal input 18 of a standard DTMF receiver 19 which converts valid DTMF signals to a four-bit binary code at a four line output 20. Each four-bit code corresponds to one of the sixteen possible standard DTMF inputs (all outputs 20 are in a low logic state when no DTMF signal is present). The number of output lines in output 20 will vary according to the binary code necessary to identify the possible DTMF inputs, should a non-standard (eight tone) encoder be used.

The four-bit output 20 drives a four-bit input 22 (address lines) of a second (receiver) ROM 21. Second ROM 21 is programmed to convert the four-bit input 22 into an eight-bit (eight data lines) output 23 (each bit in output 23 remains at a low logic state when no DTMF signal is present) such that each data line of output 23 represents (by a high logic state) one of the eight elementary tones generated by a standard DTMF encoder. Of course, the number of bits necessary in output 23 will depend upon the number of possible tones generated by the DTMF encoder, should something other than a standard eight tone encoder be utilized.

Thus, second ROM 21 generates a two-of-eight format code for each DTMF signal decoded by the DTMF receiver 19. When a signal generated by the encoder unit 100 (which comprises four distinct tones taken as two DTMF signals in repeated sequence) is decoded by DTMF receiver 19, four of the output lines 23 of second ROM 21 switch from low to high, two at a time in repeated sequence, for as long as the encoder unit 100 is generating a signal. In other words, two of the output lines 23 switch to high and then return to low, followed by another distinct pair switching to high and returning to low, this sequence being repeated for as long as a particular combination of switches S1-Sn is activated on encoder unit 100. Of course as with other components of the invention, the functions of the DTMF receiver 19 and second ROM 21 could be combined into a single combination DTMF receiver unit 400.

Each of the eight output lines 23 of second ROM 21 is inputted into one of the inputs 25 of a pulse stretcher array 24. In the embodiment shown, the pulse stretcher array 24 comprises eight pulse stretchers 43. The function of the pulse stretcher array 24 is to momentarily hold, for a desired period of time T1, a high logic level at the pulse stretcher outputs 26 after the corresponding inputs 25 make a high to low transistion. FIG. 4A illustrates the relationship of the input/output signal waveforms of the pulse stretchers 43. The pulse stretcher array 24 in effect acts as a momentary "hold" or memory, holding one DTMF signal pair for a period of time T1 which is long enough for a second DTMF signal pair to appear. The alternating two-of-eight sequence on the pulse stretcher inputs 25 thus represent, on the pulse stretcher output lines 26, a continuous four-of-eight output code. Thus, the four output lines 26 which are in a high logic state correspond to the four elementary tones generated by the encoder unit 100 for a specific command.

The pulse stretcher output 26 drives the address input 28 of third (decoder) ROM 27, which is programmed to give a specific multi-bit data output 29 corresponding to each valid four-of-eight address input 28. The address input 28 of third ROM 27 comprises corresponding address lines connected to each of the output lines 26 of pulse stretcher array 24. The data output 29 of third ROM 27 should provide one data line 44 for each control switch 36. Data lines 44 may be directly connected to control switches or devices 36. Each data line 44 is connected through a filter/momentary hold unit 45 (to be discussed subsequently) to one of the inputs 34 of an array of peripheral drivers 33. The outputs 35 of peripheral drivers 33 each drive corresponding activating lines 37 of control switches 36. The peripheral drivers 33 serve to convert the signal from the filter/momentary hold array 45 to driving current to activate relays, control switches or other control devices 36. Thus, the output 29 of third ROM 27 represents the combination of control switches 36 to be activated by activating a combination of switches S1–Sn.

As a multi-function encoding example, consider an overhead crane system which must respond to the following eight commands: ON, OFF, UP, DOWN, LEFT, RIGHT, FORWARD, REVERSE or any valid combination of these commands. Examples of valid combinations are UP-LEFT, DOWN-FORWARD, UP-LEFT-FORWARD, etc. Invalid or illegal combinations would be any combinations containing at least two functions that are impossible to be executed simultaneously. Examples of invalid combinations would be UP-DOWN, FORWARD-REVERSE-LEFT, etc. Also, the ON or OFF command either with each other or any other command constitutes an illegal command. Under these conditions there are twenty-eight valid control combinations possible for the example system. The encoder unit 100 would thus be provided (for this particular application) with eight encoding switches S1–S8 corresponding to the eight commands listed above. Each of the twenty-eight valid combinations of switches is assigned one of the thirty-six possible encoding signals via first ROM 1. Any time an invalid entry is attempted by the operator, first ROM 1 is programmed to shut down all encoding signals, resulting in all decoder switches being de-energized. Upon recognizing a valid signal, first ROM 1, in conjunction with oscillator-divider 300, will cause a pair of alternating DTMF signals to be generated and transmitted to the decoder unit 200. In the decoder unit 200, third ROM 27 is programmed to energize the correct combination of control switches 36, depending upon which of the twenty-eight possible control signals is present.

The filter/momentary hold units 30, comprising a filter/momentary hold array 45, are activated by a low logic level at their inputs 31 which are driven by the data lines 44 of third ROM 27 whenever a valid signal is detected by DTMF receiver 19. FIG. 4B illustrates the relationship between the input and output waveforms of each filter/momentary hold unit 30. As illustrated, one function of the filter/momentary hold unit 30 is to create a "delay to on" situation, wherein the input signal at input 31 is filtered such that only after the input signal remains in a low (active) logic state for a desired threshold period of time, T2, will the corresponding output 32 switch to a high logic state, activating the appropriate control switch 36. The "delay to on" property of the filter/momentary hold unit 30 eliminates extraneous switching action which may briefly result, only in certain instances, from signals composed of a trailing end of one pair of DTMF signals (one command code) and the leading end of a second pair of DTMF signals (a second command code), as the operator switches from one command to another. For example, suppose that in the overhead crane system described above, the operator is encoding the command FORWARD-LEFT and wishes to engage the additional command DOWN in order to execute a new command FORWARD-LEFT-DOWN without interrupting the previous FORWARD-LEFT motion. Assume that the code for FORWARD-LEFT is L1,H2-L2,H1 and that the code for FORWARD-LEFT-DOWN is L3,H2-L4,H4. It is possible that the code L2,H1-L3, H2, which consists of the trailing half of the first code and the leading half of the second code (assuming for example that L2,H1-L3,H2 is a valid code), would be recognized and decoded by third ROM 27. Without the filter/momentary hold unit 30, an undesirable code of very brief duration could result in a brief, undesirable control actuation. The "delay to on" action thus filters such extraneous codes during time period T2.

Also shown in FIG. 4B is another function of the filter/momentary hold unit 30. Only after the input signal has returned to a high (inactive) logic state for a period of time T3, will the output lines 32 make the transition from high to low, de-energizing the corresponding control switch(es) 36. Thus, if a filter/momentary hold unit 30 input signal makes the transition from low (active) to high (inactive) and back to low during time period T3, there would be no de-activation of the corresponding control switches 36. Therefore, the filter/momentary hold unit 30 serves the additional function of producing a "delay to off" or momentary hold action. Again considering the overhead crane example, when the operator activates the DOWN command without releasing the FORWARD and LEFT encoding switches, an entirely different code is generated corresponding to the new FORWARD-LEFT-DOWN command. Because of the momentary hold action of the filter/momentary hold unit 30, the FORWARD-LEFT-DOWN command is executed before the FORARD-LEFT command is disengaged, and the transition thus takes place with no discontinuity.

Figure 6:
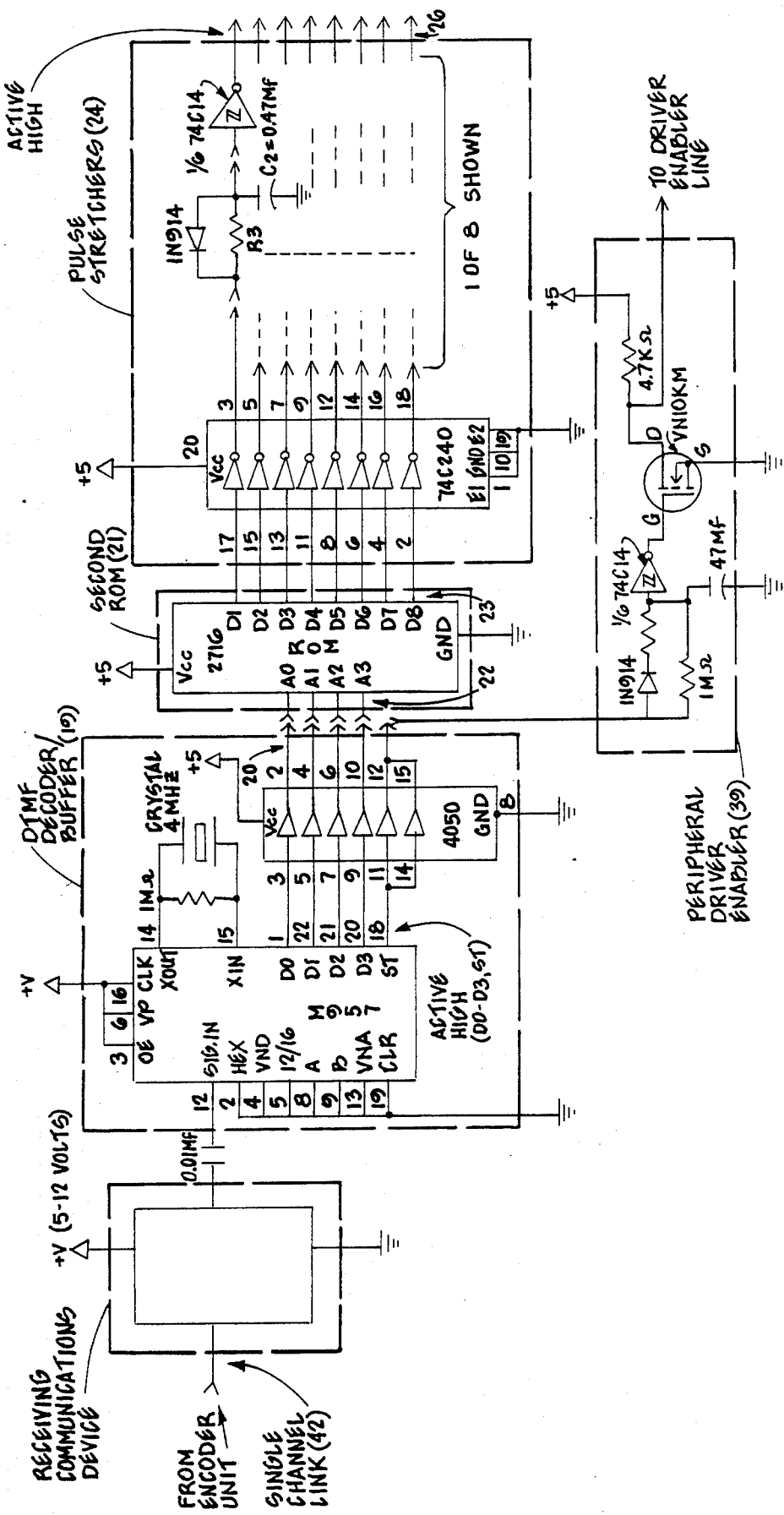
FIG. 6 is a wiring diagram illustrating one construction of the preferred embodiment shown in FIG. 3, and is continued on FIG. 7.
Figure 7:
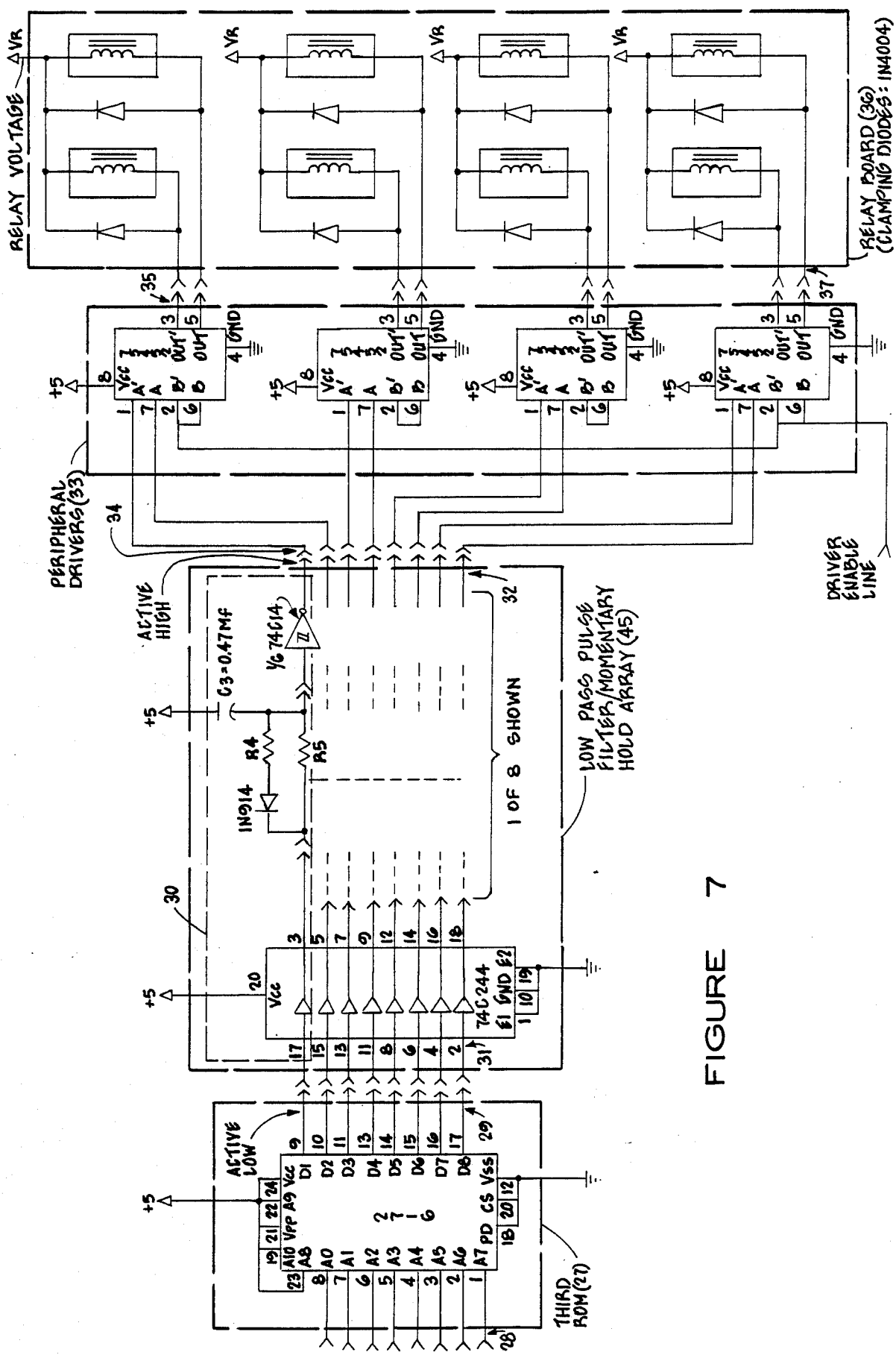
FIG. 7 is a continuation of FIG. 6.

The preferred relationship among the various time periods is explained by the following variables and equations:
Variables:
    dT=DTMF signal duration T1 = pulse stretcher momentary hold period
T2 = filter/momentary hold unit threshold period
T3 = filter/momentary hold unit momentary hold period
D = minimum amount of time required by decoder unit to decode DTMF signal
E = excess time allowed to assure decoding of DTMF signal Equations:
$dT = D + E$
$T1 = 4dT$
$T2 = E + dT + D = 2dT$
$T3 = 2E + 2dT + T2$ The above relationships provide acceptable values for the variables, allowing smooth interaction between the encoder unit 100 and decoder unit 200. The most common value for D is approximately 35 ms. In FIGS. 5 and 6, the configurations shown reflect a value for E of 10 ms. Variations of these time values will, of course, vary the operation of the system.

Calculation of necessary values shown in FIG. 5 for oscillator/divider 300 may be accomplished by use of the following variables and equation:

Variables:
  dT = DTMF signal duration in seconds
  C = capacitance in farads
  R = resistance in ohms Equation:
$dT = Ln\ 2\ C_1(R_1 + R_2)$ Calculation of $R_3$ for pulse stretchers 43 shown in FIG. 6 may be accomplished by using the following variables and equations:

Variables:
  V = 5 volts (supply)
  v = 3.6 volts ($V_{T+}$ for the 74C14 Hex Schmitt Trigger)
  $C_2 = 0.47 \times 10^{-6}$ farads
  t = T1 in seconds Equation:

$$R_3 = \frac{-t}{C_2\ Ln\ [1 - (v/V)]}$$

Calculation of $R_4$ and $R_5$ for the filter/momentary hold units shown in FIG. 6 may be accomplished by using the following variables and equations:

$R_4$ Variables:
  V = 5 volts (supply)
  v = 1.4 volts ($V_{T-}$ for the 74C14 Hex Schmitt Trigger)
  $C_3 = 0.47 \times 10^{-6}$ farads
  t = T2 in seconds $R_4$ Equations:
  $R_4 = R_5 R'/R_5 - R'$; where $$R' = \frac{-t}{C_3\ Ln\ (v/V)};$$

and $R_5$ Variables:
  V = 5 volts (supply)
  v = 3.6 volts ($V_{T+}$ for the 74C14 Hex Schmitt Trigger)
  $C_3 = 0.47 \times 10^{-6}$ farads
  t = T3 in seconds $R_5$ Equation:

$$R_5 = \frac{-t}{C_3\ Ln\ [1 - (v/V)]}$$

In all of the above equations, current, source and sink capabilities of input gates are not to be exceeded.

As a safety feature, a "valid data indication" output 38 of DTMF receiver 19, which switches to a high logic state when a valid DTMF signal is received and decoded, is connected via peripheral driver enabler 39 to the peripheral drivers 33. Only when peripheral driver enabler 39 is activated, will peripheral drivers 33 activate any of the control switches 36. Because a valid signal generated by the encoder unit 100 comprises two standard DTMF signals in repeated sequence, each separated by a silent period, the peripheral driver enabler 39 has a momentary hold action which produces a continuous high logic level during the brief silent period between valid signals. The action of the peripheral driver enabler 39 guards against accidental activation of any of the control switches 36 in the case of a malfunction of the circuitry between the receiver input line 18 and the filter/momentary hold array 45.

A preferred embodiment of a wiring diagram for the decoder unit 200 is shown in FIG. 6. As was the case with the encoder unit 100, examples of the various components of the decoder unit 200 are shown by standard electrical designations and typical values are indicated. The DTMF receiver preferably comprises a No. M-957 receiver as sold by Teltone. Other receivers such as the Silicon Systems SSI 204 chip may be utilized. A hex non-inverting buffer such as the No. 4050 buffer by National Semiconductor may be added as shown to function as a logic level converter for the system. This buffer may be eliminated by utilizing a communications link 42 having a voltage level directly compatible to that of the entire DTMF system. Second ROM 21 is shown as a No. 2716 EPROM. Combination DTMF receiver unit 400 (not shown in FIG. 6) could comprise a No. SK 9052 DTMF Receiver/Decoder, eliminating the need for second ROM 21. The pulse stretcher array 24 is shown comprising a No. 74C240 inverting octal buffer and line driver, having eight output lines connected as shown. No. 1N914 diodes, No. 74C14 hex Schmitt triggers as well as resistors and capacitors of indicated values are utilized as shown. Each output of the 74C240 utilizes one sixth of a 74C14, thus requiring two 74C14's for the eight outputs of the 74C240. Third ROM 27 is also shown as a No. 2716 EPROM. The filter/momentary hold array 45 is shown comprising a No. 74C244 non-inverting octal buffer and line driver, having eight output lines connected as shown, also utilizing No. 1N914 diodes and No. 74C14 hex Schmitt triggers. The peripheral driver enabler 39 is shown comprising various previously described components as well as a No. VN10KM power FET.

Since the system of this invention operates over a single channel communications link 42, it is possible to control multiple devices using a single encoder unit 100. This may be accomplished by using multiple single channels to control various devices. For example, to control separate overhead cranes, the operator would simply switch channels on the encoder unit 100 and proceed.

Of course, there are many alternate embodiments of the invention which will occur to those skilled in the art, and thus are intended to be included within the scope and spirit of the invention as described by the following claims.

I claim:

1. A multiplexed dual tone multi-frequency encoding/decoding system for remote control applications, comprising:
   a. an encoding switch array having a plurality of encoding switches having corresponding switch outputs such that, by activating any said switch, the corresponding output is activated;
   b. an encoder read only memory having:
      i. a plurality of address lines, the number of which corresponding to the number of said switches plus one additional address line, each said address line being connectable to one said switch output;
      ii. at least four data lines; and
      iii. at least one disabling input, for disabling all said data lines of said encoder read only memory; and
      wherein said encoder read only memory is programmed such that, for every desired combination of activated address lines, a pair of data lines will be activated;
   c. an oscillator-divider having:
      i. a first output connected to said disabling input of said encoder read only memory;
      ii. a second output connected to said additional address line of said encoder read only memory; and
      wherein said oscillator-divider generates a first pulse train having a period of desired length through said first output and said oscillator-divider further generates a second pulse train through said second output, said second pulse train having a period equal to twice that of said first pulse train, and wherein said first and second pulse trains are synchronized such that every other time said first pulse train changes state, said second pulse train changes state; and
   d. a dual tone multi-frequency tone encoder having a plurality of row inputs and a plurality of column inputs, each said input being connected to a desired data line of said encoder read only memory such that for every said pair of activated data lines, one said row input and one said column input will be activated, said tone encoder further having a dual tone output connectable to a single channel communications link, and said tone encoder further being capable of generating a dual tone signal through said dual tone output for any combination of inputs comprising one activated row input and one activated column input.

2. A multiplexed dual tone multi-frequency encoding/decoding system for remote control applications according to claim 1, further comprising:
   e. a single channel communications link, having an input connectable to said dual tone output and an output connectable to the input of a dual tone multi-frequency receiver.

3. A multiplexed dual tone multi-frequency encoding/decoding system for remote control applications according to claim 2, further comprising:
   f. a dual tone multi-frequency receiver unit, having an input connected to said communications link and a plurality of receiver unit output lines, wherein said receiver unit receives a dual tone signal from said communications link and converts said dual tone signal to a code identifying said dual tone signal and activating said receiver unit output lines according to said code;
   g. a pulse stretcher array, comprising at least four pulse stretchers, each having:
      i. an input, connected to one said receiver unit output line;
      ii. an output; and
      wherein each said pulse stretcher maintains the activated state of said receiver unit output line for a desired period of time, said activated state being transmitted through said pulse stretcher output; and
   h. a decoder read only memory, having:
      i. at least four address lines, each connected to one said pulse stretcher output;
      ii. at least one data line; and
      wherein said decoder read only memory is programmed such that, for every desired combination of activated address lines, a desired combination of data lines is activated.

4. A mulitplexed dual tone multi-frequency encoding/decoding system for remote control applications according to claim 3, further comprising:
   i. a filter/momentary hold array, comprising at least one filter/momentary hold unit, each said filter/momentary unit having:
      a. an input connected to one said decoder read only memory data line;
      b. an output; and
      wherein said filter/momentary hold unit removes extraneous signals from the output of said decoder read only memory data line and the duration of activation of said decoder read only memory data line is extended for a desired period of time.

5. A multiplexed dual tone multi-frequency encoding/decoding system for remote control applications according to claim 4, further comprising:
   j. a peripheral driver array comprising at least one peripheral driver, each said peripheral driver having:
      i. an input connected to one said filter/momentary hold unit output; and
      ii. an output connectible to a control device; and
      wherein each said peripheral driver converts the signals from said filter/momentary hold unit output to driving current to drive a control device.

6. A multiplexed dual tone multi-frequency encoding/decoding system for remote control applications according to claim 5, wherein said receiver is provided with a valid signal status output and said dual tone multi-frequency encoding/decoding system further comprises:
   k. a peripheral driver enabler having:
      i. an input connected to said valid signal status output; and
      ii. an output connected to said peripheral driver array so as to enable said peripheral driver array only when a valid sequence of dual tone signals are being received by said receiver.

7. A multiplexed dual tone multi-frequency encoding/decoding system for remote control applications, comprising:
   a. a dual tone multi-frequency receiver unit, having an input connected to a communications link and a plurality of receiver unit output lines, wherein said receiver unit receives dual tone signals from said communications link and converts said dual tone signals to a code identifying the dual tone signals and activating said receiver unit output lines according to said code;

b. a pulse stretcher array, comprisng at least four pulse stretchers, each having:
  i. an input, connected to one said receiver unit output line;
  ii. an output;
  wherein each said pulse stretcher maintains the activated state of said receiver unit output line for a desired period of time, said activated state being transmitted through said pulse stretcher output; and c. a decoder read only memory, having:
  i. at least four address lines, each connected to one said pulse stretcher output;
  ii. at least one data line; and
  wherein said decoder read only memory is programmed such that, for every desired combination of activated address lines, a desired combination of data lines is activated.

8. A multiplexed dual tone multi-frequency encoding/decoding system for remote control applications according to claim 7, further comprising:

d. a filter/momentary hold array, comprising at least one filter/momentary hold unit, each said unit having:
  i. an input connected to one said decoder read only memory data line;
  ii. an output; and
  wherein said filter/momentary hold unit removes extraneous signals from the output of said decoder read only memory data line and the duration of activation of said decoder read only memory data line is extended for a desired period of time.

9. A multiplexed dual tone multi-frequency encoding/decoding system for remote control applications according to claim 8, further comprising:

e. a peripheral driver array comprising at least one peripheral driver, each said peripheral driver having:
  i. an input connected to one said filter/ momentary hold unit output; and
  ii. an output connectible to a control device; and
  wherein each said peripheral driver converts the signals from said filter/momentary hold unit output to driving current to drive a control device.

10. A multiplexed dual tone multi-frequency encoding/decoding system for remote control applications according to claim 9, wherein said receiver is provided with a valid signal status output and said dual tone multi-frequency encoding/decoding system further comprises:

f. a peripheral driver enabler having:
  i. an input connected to said valid signal status output; and
  ii. an output connected to said peripheral driver array so as to enable said peripheral driver array only when a valid sequence of dual tone signals is being received by said receiver.

11. A multiplexed dual tone multi-frequency encoding/decoding system for remote control applications according to claim 1, further comprising:

e. a system power unit, connected to said system so as to provide power thereto.

12. A multiplexed dual tone multi-frequency encoding/decoding system for remoter control applications according to claim 11, wherein said system power unit automatically shuts system power down upon detecting a desired voltage level.

13. A multiplexed dual tone multi-frequency encoding/decoding system for remote control applications according to claim 12, wherein said system power unit is provided with a shut down override switch.

14. A multiplexed dual tone multi-frequency encoding/decoding system for remote control applications according to claim 8, wherein said receiver unit comprises:

i. a dual tone multi-frequency receiver, having an input connected to said communications link and a plurality of receiver output lines, wherein said receiver receives a dual tone signal from said communications link and converts said dual tone signals to a code identifying the dual tone signals and activating said receiver output lines according to said code; and ii. a receiver read only memory, having
  (i) a plurality of address lines, each connected to one said receiver output line;
  wherein said receiver read only memory is programmed such that, for every code received by said address lines, a desired pair of said data lines is activated.

15. A multiplexed dual tone multi-frequency encoding/decoding system for remote control applications according to claim 2, wherein said communications link is capable of switching between a plurality of single channels.

* * * * *